United States Patent
Fornero

(10) Patent No.: US 7,561,077 B1
(45) Date of Patent: Jul. 14, 2009

(54) MULTIPLE STREAM MULTIPLE RATE RESAMPLING COMPONENT

(75) Inventor: Scott Fornero, Mesquite, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 0 days.

(21) Appl. No.: 11/966,590

(22) Filed: Dec. 28, 2007

(51) Int. Cl.
*H03M 7/00* (2006.01)

(52) U.S. Cl. .................................................. 341/61

(58) Field of Classification Search ................ 341/144, 341/155, 123, 61, 143
See application file for complete search history.

(56) References Cited

U.S. PATENT DOCUMENTS

| | | | | |
|---|---|---|---|---|
| 5,173,948 A | * | 12/1992 | Blackham et al. | 382/293 |
| 5,945,885 A | * | 8/1999 | Schwartz et al. | 332/100 |
| 6,584,145 B1 | * | 6/2003 | Camagna et al. | 375/216 |
| 7,064,770 B2 | * | 6/2006 | Lachine et al. | 345/611 |

* cited by examiner

Primary Examiner—Brian Young
(74) Attorney, Agent, or Firm—Hovey Williams LLP

(57) ABSTRACT

A method of resampling a digital signal involves serially receiving a plurality of samples of said digital signal and applying a plurality of filter coefficients to a first subset of the plurality of samples to generate a first plurality of intermediate results and to a second subset of the samples to generate a second plurality of intermediate results. The first plurality of intermediate results is accumulated to generate a first resampled value, and the second plurality of intermediate results is accumulated to generate a second resampled value. Upon receipt, each signal sample may be used to update each of a plurality of running accumulation values and then discarded before receipt of a next signal sample. Furthermore, multiple signals may be resampled concurrently using a single filter path by multiplexing circuit components, such as memory blocks.

19 Claims, 3 Drawing Sheets

MULTIPLE STREAM MULTIPLE RATE RESAMPLING COMPONENT

BACKGROUND

1. Field

The present invention relates to digital resampling. More particularly, embodiments of the invention involve a method and apparatus for concurrently resampling multiple digital signal streams representing multiple signal rates through a single filter path.

2. Description of Related Art

Digital resampling involves converting a first series of values representing a digital signal sampled at a first rate to a second series of values representing the same digital signal sampled at a second rate. Resampling to a lower sample rate is referred to as down sampling or decimation. Decimation may be performed by filtering the original signal using a digital filter implemented in either software or hardware. Implementing such filters requires a relatively large amount of circuit resources. Implementing a digital filter in software, for example, requires a computer processor, and implementing a digital filter in hardware requires a series of arithmetic components, such as adders and multipliers.

Multiple channel resampling involves concurrently resampling more than one digital signal, and may require use of two or more different filters. Multiple rate resampling has been addressed using, for example, multiple filter paths and a switch for directing each of various signals to a particular filter path. This approach requires an additional set of resources (filter path) for each resampling filter. For example, each filter path may involve pipe-lining signal samples through a series of multipliers and adders, requiring a separate set of multipliers and adders for each signal stream to be processed. For relatively large filters (such as finite impulse response filters of eight weights or more), such an approach can require the use of a large number of resources, particularly if multiple resampling filters are used.

Accordingly, there is a need for an improved method and apparatus for signal resampling that does not suffer from the limitations of the prior art.

SUMMARY

The present invention provide an improved system and method for resampling digital signals that does not suffer from the limitations of the prior art. Particularly, embodiments of the invention provide a method of resampling a digital signal involving serially receiving a plurality of samples of the digital signal, applying a plurality of filter coefficients to a first subset of the plurality of samples to generate a first plurality of intermediate results, and applying the plurality of filter coefficients to a second subset of the plurality of samples to generate a second plurality of intermediate results. The second subset includes at least one sample from the first subset and at least one sample not present in the first subset.

The first plurality of intermediate results are accumulated to generate a first resampled value, wherein the first plurality of intermediate results is accumulated by sequentially combining each intermediate result with a first accumulation value. The second plurality of intermediate results is accumulated to generate a second resampled value, wherein the second plurality of intermediate results is accumulated by sequentially combining each intermediate result with a second accumulation value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Preferred implementations of the present invention are described in detail below with reference to the attached drawing figures, wherein.

DETAILED DESCRIPTION

The following detailed description of various embodiments of the present invention references the accompanying drawings that illustrate specific embodiments in which the invention can be practiced. The embodiments are intended to describe certain aspects of the invention in sufficient detail to enable those skilled in the art to practice the technology. Other embodiments can be utilized and changes can be made without departing from the scope of the invention. The following detailed description is, therefore, not to be taken in a limiting sense. The scope of the present invention is defined only by the appended claims, along with the full scope of equivalents to which such claims are entitled.

Figure 1:
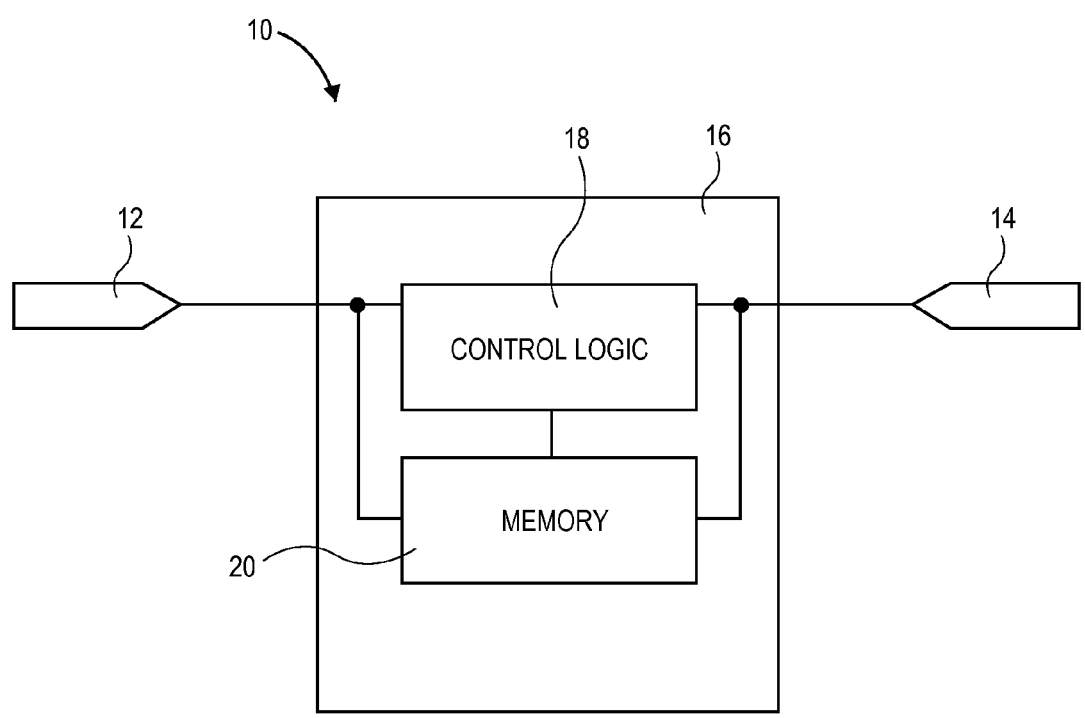
FIG. 1 is a block diagram of an exemplary system for resampling a digital signal according to principles of the present invention.

A system embodying principles of the present technology is illustrated in FIG. 1 and designated generally by the reference numeral 10. The system 10 includes a data input 12, a data output 14, and a circuit 16 generally including a controller 18 and a memory 20. The data input 12 and the data output 14 are illustrated as generalized inputs and outputs and may include various types and sizes of inputs and outputs, respectively. The circuit 16 may be fixed, such as an application specific integrated circuit, a digital signal processing (DSP) chip or a dedicated finite impulse response (FIR) filter chip; or may be programmable, such as a field programmable gate array (FPGA) or a complex programmable logic device (CPLD).

The system 10 is operable to decimate (down sample) an input signal by a predetermined decimation factor by filtering the input signal applying, for example, a finite impulse response (FIR) filter represented by equation (1), as follows:

$$Y(n) = \sum_{m=0}^{M-1} C_m \times X_{(D \times n - m + 1)}, \quad (1)$$

where M is the number of filter coefficients (taps), D is the decimation factor, $C_m$ is a filter coefficient, and the value M/D may be an integer. Using equation (1), a new output value Y is generated for every D input values of X. The output Y(n) is invalid if D×n is less than M.

An exemplary application of equation (1), wherein the decimation factor is two (i.e., D=2), is illustrated in Table 1. Each row of Table 1 corresponds to a successive time when a new output Y is generated. Each input value X is multiplied by a corresponding coefficient C at the top of the column to form an intermediate value, and all intermediate values in each row are added to form the corresponding output Y depicted at the far right side of the row. Because the decimation factor D is two in the exemplary application illustrated in Table 1, a new output value Y is generated for each pair of new input values X received. If the decimation factor D is three, a new output value Y is generated upon receipt of three new input values X, if the decimation factor D is four, a new output value Y is generated upon receipt of four new input values, and so forth. Because equation (1) represents a FIR filter, each output Y is generated based solely on current and past input values X. Furthermore, equation (1) may be solved in an iterative fashion, wherein only a most recent X value and one or more running, cumulative Y values need to be retained at any given time.

to zero. Furthermore, a number M of pre-determined filter coefficients are placed in the first memory element 24.

In operation, a new X value (X(p)) is first received at the input 12, as depicted in block 32. The variable coef_offset is set equal to the variable dec_offset and a variable store_indx is set equal to the variable output_num, as depicted in block 34. A next Y value is updated by adding the current Y value to the product of the current input sample X(p) and a coefficient corresponding to the variable coef_offset, as depicted in block 36. The variable coef_offset is incremented by an amount equal to D, as depicted in block 38, because not every coefficient value stored in the first memory element 24 is used, as can be seen in Table 1. Although not illustrated in FIG. 3, if the variable coef_offset is equal to a maximum, such as twelve, fourteen, sixteen, and so forth, the variable coef_offset is set to zero in block 38.

The variable stor_indx is tested to determine whether it is equal to the variable output_num−1, as depicted in block 40. If the variable stor_indx is not equal to output_num−1, not all Y values have been updated in the second memory module 28. The variable stor_indx is then incremented by one, as depicted in block 42, to indicate the next Y value to be updated in the second memory element 28. The variable stor_indx is

TABLE 1

| $C_0$ | $C_1$ | $C_2$ | $C_3$ | $C_4$ | $C_5$ | $C_6$ | $C_7$ | $C_8$ | $C_9$ | $C_{10}$ | $C_{11}$ | |
|---|---|---|---|---|---|---|---|---|---|---|---|---|
| $X_1$ | $X_0$ | | | | | | | | | | | $Y_0$ |
| $X_3$ | $X_2$ | $X_1$ | $X_0$ | | | | | | | | | $Y_1$ |
| $X_5$ | $X_4$ | $X_3$ | $X_2$ | $X_1$ | $X_0$ | | | | | | | $Y_2$ |
| $X_7$ | $X_6$ | $X_5$ | $X_4$ | $X_3$ | $X_2$ | $X_1$ | $X_0$ | | | | | $Y_3$ |
| $X_9$ | $X_8$ | $X_7$ | $X_6$ | $X_5$ | $X_4$ | $X_3$ | $X_2$ | $X_1$ | $X_0$ | | | $Y_4$ |
| $X_{11}$ | $X_{10}$ | $X_9$ | $X_8$ | $X_7$ | $X_6$ | $X_5$ | $X_4$ | $X_3$ | $X_2$ | $X_1$ | $X_0$ | $Y_5$ |
| $X_{13}$ | $X_{12}$ | $X_{11}$ | $X_{10}$ | $X_9$ | $X_8$ | $X_7$ | $X_6$ | $X_5$ | $X_4$ | $X_3$ | $X_2$ | $Y_6$ |
| $X_{15}$ | $X_{14}$ | $X_{13}$ | $X_{12}$ | $X_{11}$ | $X_{10}$ | $X_9$ | $X_8$ | $X_7$ | $X_6$ | $X_5$ | $X_4$ | $Y_7$ |
| $X_{17}$ | $X_{16}$ | $X_{15}$ | $X_{14}$ | $X_{13}$ | $X_{12}$ | $X_{11}$ | $X_{10}$ | $X_9$ | $X_8$ | $X_7$ | $X_6$ | $Y_8$ |
| $X_{19}$ | $X_{18}$ | $X_{17}$ | $X_{16}$ | $X_{15}$ | $X_{14}$ | $X_{13}$ | $X_{12}$ | $X_{11}$ | $X_{10}$ | $X_9$ | $X_8$ | $Y_9$ |
| $X_{21}$ | $X_{20}$ | $X_{19}$ | $X_{18}$ | $X_{17}$ | $X_{16}$ | $X_{15}$ | $X_{14}$ | $X_{13}$ | $X_{12}$ | $X_{11}$ | $X_{10}$ | $Y_{10}$ |
| $X_{23}$ | $X_{22}$ | $X_{21}$ | $X_{20}$ | $X_{19}$ | $X_{18}$ | $X_{17}$ | $X_{16}$ | $X_{15}$ | $X_{14}$ | $X_{13}$ | $X_{12}$ | $Y_{11}$ |
| $X_{25}$ | $X_{24}$ | $X_{23}$ | $X_{22}$ | $X_{21}$ | $X_{20}$ | $X_{19}$ | $X_{18}$ | $X_{17}$ | $X_{16}$ | $X_{15}$ | $X_{14}$ | $Y_{12}$ |

Figure 2:
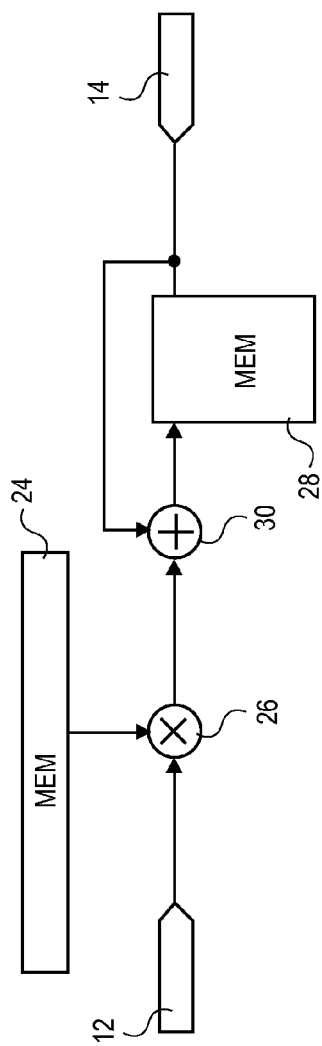
FIG. 2 is a block diagram of certain functions of an exemplary circuit of the system of FIG. 1 according to a first implementation operable to resample a single channel.

A first exemplary circuit 22 of the system 10 operable to resample a signal is depicted in FIG. 2. The input 12 and a first memory element 24 are connected to a multiplier 26. An output of the multiplier 26 and the output of a second memory element 28 are connected to an adder 30. The output of the second memory element 28 is also connected to the data output 14. The circuit 22 may further include control logic (not shown) for enabling the various elements of the circuit 22 to filter an input signal according to, for example, equation (1).

It will be appreciated that FIG. 2 illustrates various exemplary functional blocks and that the functions depicted in the circuit 22 may be implemented using any of various different electrical and/or electronic circuits. By way of example, the first memory element 24 may be a read-only memory (ROM) module containing a plurality of filter coefficients stored according to a predetermined coefficient order, and the second memory element 28 may be a random access memory (RAM) module with a depth of M/D. Alternatively, the first memory element 24 and the second memory element 28 may be part of a single block of RAM elements.

Figure 3:
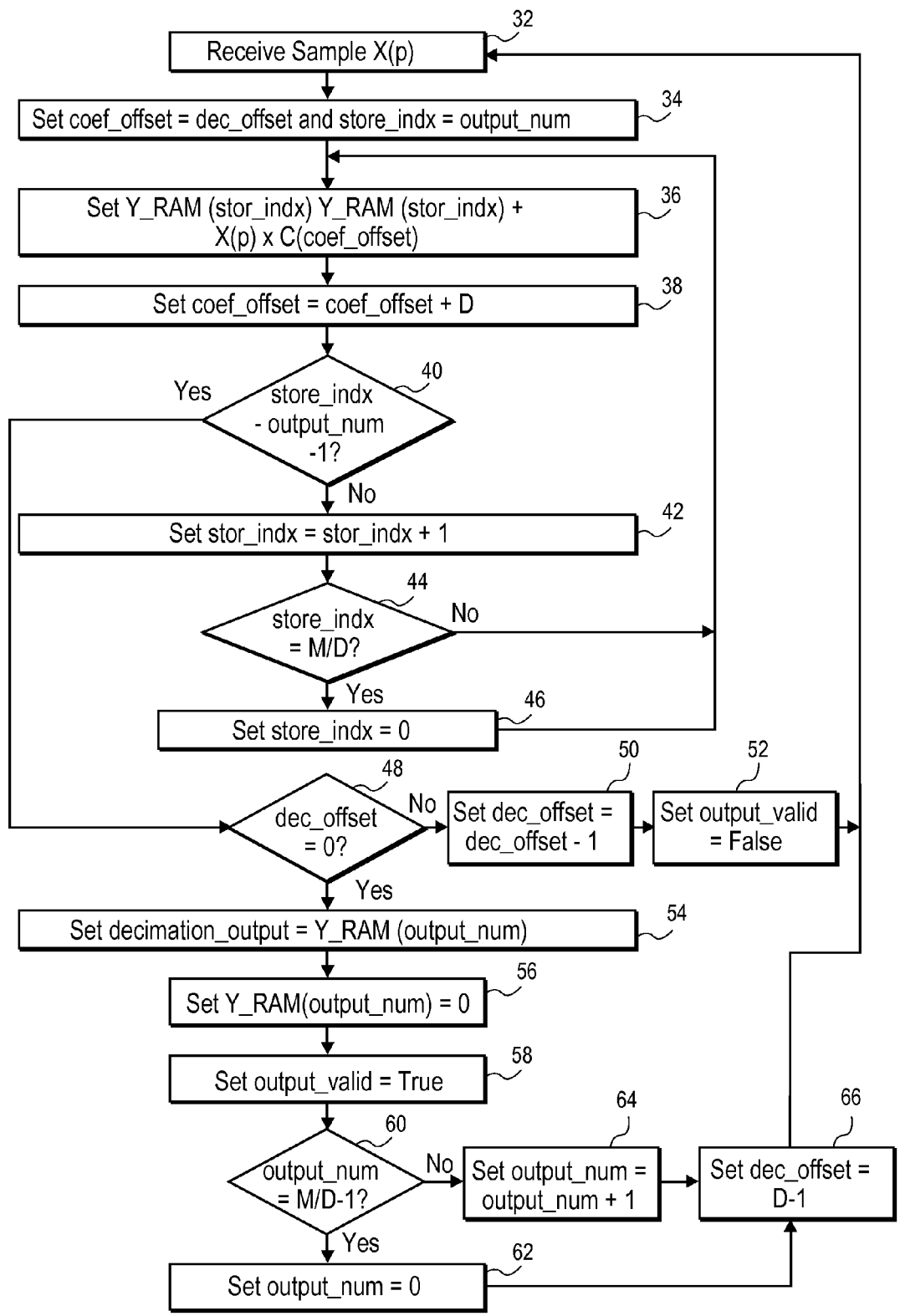
FIG. 3 is a flow diagram illustrating certain steps performed in a process of resampling a digital signal using the circuit of FIG. 2.

A flow diagram illustrating exemplary steps performed by the circuit 22 is shown in FIG. 3. Before the steps illustrated in FIG. 3 are executed, the system 10 is initialized, wherein a decimation offset variable dec_offset is initialized to a value D−1 and an output number variable output_num is initialized then tested to determine whether it is equal to M/D, as depicted in block 44. If the variable store_indx is not equal to M/D, the process flow returns to block 36. If the variable store_indx is equal to output_num−1, it is set equal to zero, as depicted in block 46, and the process flow returns to block 36.

If the variable stor_indx is equal to output_num−1, all eligible Y values have been updated to reflect the new X value. If the second memory module 28 includes exactly M/D storage locations, the second memory module 28 will also be full of updated Y values when stor_indx is equal to output_num−1. The variable dec_offset is tested to determine whether it is equal to zero, as depicted in block 48. If not, dec_offset is decremented by one, as depicted in block 50, the variable output_valid is set equal to False, as depicted in block 52, and the system waits for the next X value. If dec_offset is found to be equal to zero in block 48, one of the Y values in the second memory element 28 is communicated to an output decimation_output, such as output 14, as depicted in block 54. The memory location storing the Y value communicated to the decimation_output is set to zero, as depicted in block 56, in preparation for the next accumulation steps. The variable output_valid is set to true, as depicted in block 58.

The particular Y value that is communicated to the output 14 and reset to zero is determined by the variable output_num, which is incremented (or reset to zero to wrap around to a first storage location of the second memory module 28 if an end of the memory module 28 is reached) each time a Y value is communicated to the output 14. Therefore, after a Y value is communicated to decimation_output, output_num is tested to determine whether it is equal to M/D−1, as depicted in block 60. If output_num is equal to M/D−1, it is reset to zero, as depicted in block 62. If output_num is not equal to M/D−1, it is incremented, as depicted in block 64. The variable dec_offset is set equal to D−1, as depicted in block 66, and the system waits for the next X value. The process represented in FIG. 3 uses only a most recent X value to update a plurality of running Y values and does not store previous X values. The most recent X value may be discarded after it is multiplied by each of the relevant coefficients. As used herein, "discarding" a value means not using or actively retaining the value, and does not mean actively expunging the value from the system 10. It will be appreciated that the data bits representing a discarded value may persist in one or more elements of the circuit 22 a next value is processed.

In a particular embodiment, the second memory module 28 can hold exactly M/D Y values, thus minimizing the amount of resources necessary to implement the FIR filter characterized by equation (1), above. Where D=2 and there are twelve coefficients (C values), for example, M/D=6, minimizing the size of the second memory module 28.

Figure 4:
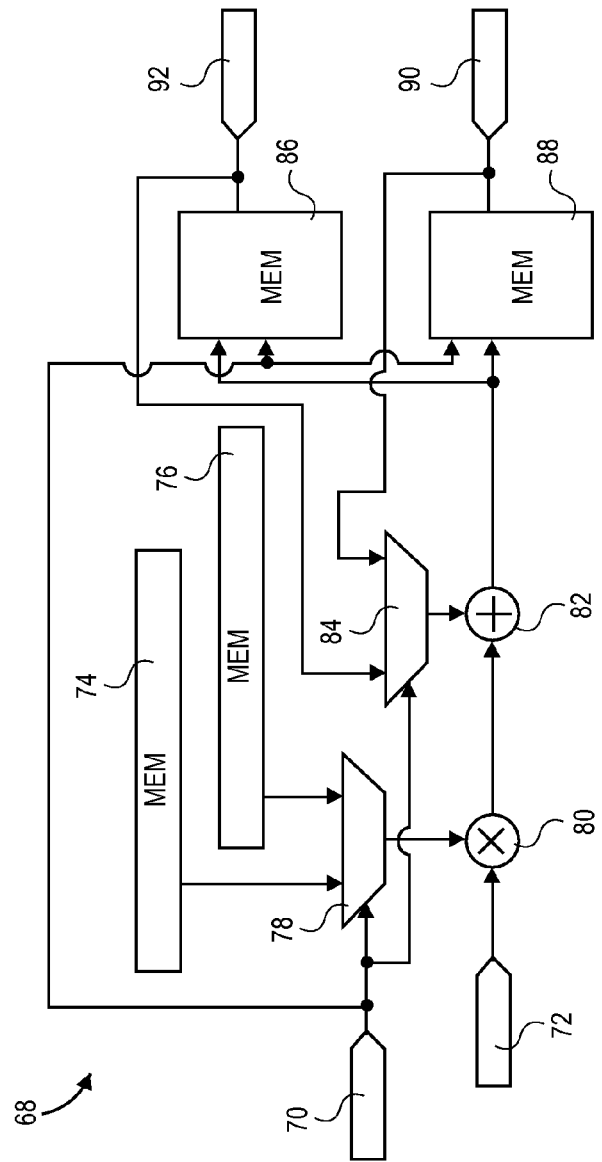
FIG. 4 is a block diagram of certain functions of an exemplary circuit of the system of FIG. 1 according to a second implementation operable to concurrently resample multiple channels.

The circuit 22 is generally capable of filtering a single signal through a single data path. A second exemplary circuit 62 of the system 10 operable to resample a signal is depicted in FIG. 4. The circuit 62 of FIG. 4 is similar to the circuit 22 depicted in FIG. 2, except that the circuit 62 can concurrently process multiple streams of input signal data with a single filter path, as explained below.

The circuit 68 includes a data input 72 for receiving X values, and a channel select input 70 for identifying a present channel or signal. Both inputs 70,72 may correspond to input 12, described above. If two signals are represented by the input signals X, two sets of filter coefficients may be stored in each of two memory modules 74,76, wherein a first set of filter coefficients is stored in a first memory module 74 and a second set of filter coefficients is stored in a second memory module 76. The channel select input 70 actuates a multiplexer 78 to connect one of the two memory modules 74,76 to a multiplier 80. The output of the multiplier 80 is connected to an adder 82, which receives an output of a second multiplexer 84 which selects an output of third and fourth memory modules 86,88 according to the channel select input 70. Each of the third and fourth memory modules 86,88 is connected to one of two outputs 90,92. Because two sets of filter coefficients may be available in the circuit 68, a first filter may be applied to a first signal and a second filter may be applied to a second signal.

The process illustrated in FIG. 3 may be implemented on each of two signals or input streams in FIG. 4, wherein a first signal is processed using the first memory element 74 and the third memory element 86, and a second signal is processed using the second memory element 76 and the fourth memory element 88. By way of example, the two signals may be time division multiplexed on the input 72, wherein a signal on the channel select input 70 enables the circuit 68 to concurrently process the two signals by alternatingly processing samples from one signal and then the other signal.

Using either of the circuits 22,68, processing may be performed in multiple stages to further reduce the amount of hardware resources required to perform the resampling. A first stage of resampling may be performed by the circuit 22, for example, wherein the results of the first stage of resampling are stored in memory and communicated back to the circuit 22 for a second stage of resampling. Alternatively, two instances of either circuit 22,68 may be connected in series.

Table 2 illustrates an exemplary dual-stage implementation of the present technology. Where the decimation factor D is eight, for example, a first stage is executed with a decimation factor D of four and a second stage is executed with a decimation factor D of two. It should be noted that given the parameters set forth in Table 2, the number of iterations and the minimum size of the memory element holding the Y values remain constant: twenty-one in the first stage and forty-eight in the second stage. It will be appreciated that a relatively small number of resources are required even where the decimation factor is relatively high, such as twenty-five or thirty-two.

TABLE 2

| Decimation Factor (D) | $1^{st}$ Stage Decimation | $1^{st}$ Stage Taps | $1^{st}$ Stage M/D | $2^{nd}$ Stage Decimation | $2^{nd}$ Stage Taps | $2^{nd}$ Stage M/D |
|---|---|---|---|---|---|---|
| 1 | Off | Off | — | Off | Off | — |
| 2 | Off | Off | — | 2 | 96 | 48 |
| 3 | Off | Off | — | 3 | 144 | 48 |
| 4 | Off | Off | — | 4 | 192 | 48 |
| 5 | Off | Off | — | 5 | 240 | 48 |
| 8 | 4 | 84 | 21 | 2 | 96 | 48 |
| 12 | 4 | 84 | 21 | 3 | 144 | 48 |
| 16 | 4 | 84 | 21 | 4 | 192 | 48 |
| 25 | 5 | 105 | 21 | 5 | 240 | 48 |
| 32 | 8 | 168 | 21 | 4 | 192 | 48 |

Although the present technology has been described with reference to the preferred embodiments illustrated in the attached drawings, it is noted that equivalents may be employed and substitutions made herein without departing from the scope of the subject matter recited in the claims. It will be appreciated, for example, that the multiplier 26 and the adder 30 may be supplemented with or replaced by other mathematical modules for performing filter operations.

Having thus described preferred implementations of the present technology, what is claimed as new and desired to be protected by Letters Patent includes the following:

1. A method of resampling a digital signal, said method comprising:
   serially receiving a plurality of samples of said digital signal;
   applying a plurality of filter coefficients to a first subset of said plurality of samples to generate a first plurality of intermediate results;
   applying said plurality of filter coefficients to a second subset of said plurality of samples to generate a second plurality of intermediate results, wherein said second subset includes at least one sample from said first subset and at least one sample not present in said first subset;
   accumulating said first plurality of intermediate results to generate a first resampled value, wherein said first plurality of intermediate results is accumulated by sequentially combining each intermediate result with a first accumulation value; and
   accumulating said second plurality of intermediate results to generate a second resampled value, wherein said second plurality of intermediate results is accumulated by sequentially combining each intermediate result with a second accumulation value,
   wherein said second subset includes R−D of samples of said first subset and D samples not present in said first subset, where R is equal to the total number of samples in said first subset and D is a decimation factor.

2. The method as set forth in claim 1, wherein R is a multiple of D.

3. A method of resampling a digital signal, said method comprising:

serially receiving a plurality of samples of said digital signal;

applying a plurality of filter coefficients to a first subset of said plurality of samples to generate a first plurality of intermediate results;

applying said plurality of filter coefficients to a second subset of said plurality of samples to generate a second plurality of intermediate results, wherein said second subset includes at least one sample from said first subset and at least one sample not present in said first subset;

accumulating said first plurality of intermediate results to generate a first resampled value, wherein said first plurality of intermediate results is accumulated by sequentially combining each intermediate result with a first accumulation value; and accumulating said second plurality of intermediate results to generate a second resampled value, wherein said second plurality of intermediate results is accumulated by sequentially combining each intermediate result with a second accumulation value, wherein each intermediate result is generated only once, wherein at least one sample of said plurality of samples is applied to a first coefficient to generate a first one of said first plurality of intermediate results and to a second coefficient to generate a first one of said second plurality of intermediate results, and is discarded after being applied to only to said first coefficient and to said second coefficient.

4. The method as set forth in claim 3, wherein said first one of said first plurality of intermediate results is discarded after it is combined once with said first accumulation value, and wherein said first one of said second plurality of intermediate results is discarded after it is combined once with said second accumulation value.

5. A method of resampling a digital signal, said method comprising:

serially receiving a plurality of samples of said digital signal;

applying a plurality of filter coefficients to a first subset of said plurality of samples to generate a first plurality of intermediate results;

applying said plurality of filter coefficients to a second subset of said plurality of samples to generate a second plurality of intermediate results, wherein said second subset includes at least one sample from said first subset and at least one sample not present in said first subset;

accumulating said first plurality of intermediate results to generate a first resampled value, wherein said first plurality of intermediate results is accumulated by sequentially combining each intermediate result with a first accumulation value;

accumulating said second plurality of intermediate results to generate a second resampled value, wherein said second plurality of intermediate results is accumulated by sequentially combining each intermediate result with a second accumulation value;

applying a different filter coefficient to each of said plurality of samples; and selecting said filter coefficients from a list of coefficients according to an order, wherein said order is applied to said plurality of samples of said digital signal as each of said samples is received.

6. A method of resampling a digital signal, said method comprising:

serially receiving a plurality of samples of said digital signal;

applying a plurality of filter coefficients to a first subset of said plurality of samples to generate a first plurality of intermediate results;

applying said plurality of filter coefficients to a second subset of said plurality of samples to generate a second plurality of intermediate results, wherein said second subset includes at least one sample from said first subset and at least one sample not present in said first subset;

accumulating said first plurality of intermediate results to generate a first resampled value, wherein said first plurality of intermediate results is accumulated by sequentially combining each intermediate result with a first accumulation value;

accumulating said second plurality of intermediate results to generate a second resampled value, wherein said second plurality of intermediate results is accumulated by sequentially combining each intermediate result with a second accumulation value; and extracting said plurality of samples of said digital signal from a serial signal, wherein said plurality of samples of said digital signal are multiplexed within said digital signal.

7. A method of resampling a digital signal, said method comprising:

serially receiving a plurality of samples of said digital signal;

applying a plurality of filter coefficients to a first subset of said plurality of samples to generate a first plurality of intermediate results;

applying said plurality of filter coefficients to a second subset of said plurality of samples to generate a second plurality of intermediate results, wherein said second subset includes at least one sample from said first subset and at least one sample not present in said first subset;

accumulating said first plurality of intermediate results to generate a first resampled value, wherein said first plurality of intermediate results is accumulated by sequentially combining each intermediate result with a first accumulation value;

accumulating said second plurality of intermediate results to generate a second resampled value, wherein said second plurality of intermediate results is accumulated by sequentially combining each intermediate result with a second accumulation value;

accumulating said first subset of intermediate results by adding each of said intermediate results with said first single accumulation value as each intermediate result is generated to update said first single accumulation value; and accumulating said second subset of intermediate results by adding each of said intermediate results with said second single accumulation value as each intermediate result is generated to update said second single accumulation value.

8. A method of resampling a digital signal, said method comprising:

serially receiving a plurality of samples of said digital signal;

applying a plurality of filter coefficients to a first subset of said plurality of samples to generate a first plurality of intermediate results;

applying said plurality of filter coefficients to a second subset of said plurality of samples to generate a second plurality of intermediate results, wherein said second subset includes at least one sample from said first subset and at least one sample not present in said first subset;

accumulating said first plurality of intermediate results to generate a first resampled value, wherein said first plurality of intermediate results is accumulated by sequentially combining each intermediate result with a first accumulation value;

accumulating said second plurality of intermediate results to generate a second resampled value, wherein said second plurality of intermediate results is accumulated by sequentially combining each intermediate result with a second accumulation value;

applying a plurality of filter coefficients to a plurality of resampled values including said first resampled value and said second resampled value to generate a plurality of second stage intermediate results;

accumulating a first subset of said second stage intermediate results to generate a third resampled value, wherein said first subset of second stage intermediate results is accumulated by sequentially combining each intermediate result with a third accumulation value; and accumulating a second subset of said second stage intermediate results to generate a fourth resampled value, wherein said second subset of second stage intermediate results is accumulated by sequentially combining each intermediate result with a fourth accumulation value.

9. A method of resampling a digital signal, said method comprising:
(a) receiving a sample of said digital signal;
(b) selecting a filter coefficient from a list of ordered filter coefficients, wherein said filter coefficient is selected as a next filter coefficient in order following a previously-selected filter coefficient;
(c) multiplying said sample of said digital signal by said selected filter coefficient to generate an intermediate result;
(d) adding said intermediate result with an old accumulation value selected from a first memory in order following a previously-selected old accumulation value following an accumulation value order to generate an add result, and storing said add result in said first memory as a new accumulation value replacing said old accumulation value;
(e) performing steps (b) through (d) for each of M/D accumulation values of said digital signal, wherein M is the total number of filter coefficients contained in said list of filter coefficients and D is a decimation value;
(f) discarding said sample of said digital signal after performing step (e) and before receiving a next sample of said digital signal;
(g) performing step (a) through (f) for each of D samples of said digital signal; and
(h) thereafter identifying a valid resampled value from among said accumulation values and preserving said valid resampled value, wherein identifying said valid resampled value involves selecting a next accumulation value following a previously-selected accumulation value according to said accumulation value order.

10. The method as set forth in claim 9, wherein preserving said valid resampled value involves storing said valid resampled value in a second memory.

11. The method as set forth in claim 9, wherein storing said add results in said first memory as new accumulation values involves storing each of said add results in a location of said first memory corresponding to a location of an old accumulation value used to generate said add result, such that said old accumulation values are replaced by said new accumulation values.

12. The method as set forth in claim 9, further comprising
(i) performing steps (a) through (h) a plurality of times to generate a plurality of resampled values;
(j) for each of $D_2$ resampled values—
($j_1$) selecting a filter coefficient from a list of ordered filter coefficients, wherein said filter coefficient is selected as a next filter coefficient in order following a previously-selected filter coefficient;
($j_2$) multiplying said resampled valued by said selected filter coefficient to generate a second stage intermediate result;
($j_3$) adding said second stage intermediate result with each of $M_2/D_2$ old second stage accumulation values stored in said first memory according to said accumulation value order to generate $M_2/D_2$ second stage add results, and storing each of said second stage add results in said first memory as new second stage accumulation values according to said accumulation value order, wherein $M_2$ is the total number of filter coefficients contained in said list of filter coefficients and $D_2$ is a decimation value; and
(k) thereafter identifying a valid second stage resampled value from among said accumulation values and preserving said valid resampled value, wherein identifying said valid resampled value involves selecting a next second stage accumulation value following a previously-selected second stage accumulation value according to said accumulation value order.

13. An electric circuit for resampling a digital signal, said circuit comprising:
a signal input for serially receiving a plurality of samples of said digital signal;
a first memory module containing a first plurality of filter coefficients;
a second memory module;
a multiply component for receiving a first value from said input and a second value from said first memory module and multiplying said first value by said second value to generate an intermediate value;
an add component for adding said intermediate value to an output of said second memory module and storing a result in said second memory module; and
a control module for enabling said first memory module, said second memory module, said multiply component, and said add component to apply a plurality of said filter coefficients to a first subset of said plurality of samples to generate a first plurality of intermediate results, to apply said plurality of said filter coefficients to a second subset of said plurality of samples to generate a second plurality of intermediate results, to accumulate said first plurality of intermediate results to generate a first resampled value stored in said second memory module, and to accumulate said second plurality of intermediate results to generate a second resampled value stored in said second memory module, wherein said second subset includes at least one sample from said first subset and at least one sample not present in said first subset.

14. The circuit as set forth in claim 13, wherein said second subset includes R–D of samples of said first subset and D samples not present in said first subset, where R is equal to the total number of samples in said first subset and D is a decimation factor.

15. The circuit as set forth in claim 14, wherein R is a multiple of D.

16. The circuit as set forth in claim 13, wherein said control module applies a different filter coefficient to each of said plurality of samples.

17. The circuit as set forth in claim 16, wherein said control module further selects said filter coefficients from said first memory module according to an order, wherein said order is applied to said plurality of samples of said digital signal as each of said samples is received.

18. The circuit as set forth in claim 13, wherein said control module further enables said first memory module, said second memory module, said multiplication component, and said adder to accumulate said first subset of intermediate results by adding each of said intermediate results with a first value stored at a first location of said second memory module as each intermediate result is generated; and to accumulate said second subset of intermediate results by adding each of said intermediate results with a second value stored at a second location of said second memory module as each intermediate result is generated.

19. The circuit as set forth in claim 13, further comprising—
- an input for receiving a channel select signal;
- a third memory module containing a plurality of filter coefficients;
- a fourth memory module;
- first selection circuitry for selecting one of an output of said first memory module and an output of said third memory module according to said channel select signal, and communicating said selected output to said multiplication component; and
- second selection circuitry for selecting one of an output of said second memory module and an output of said fourth memory module according to said channel select signal, and communicating said selected output to said add component,
- wherein said second memory module and said fourth memory module are enabled according to said channel selected signal.

* * * * *